United States Patent
Kamiya et al.

(10) Patent No.: US 10,914,176 B2
(45) Date of Patent: Feb. 9, 2021

(54) COMPOSITE BLADE AND METHOD OF MANUFACTURING COMPOSITE BLADE

(71) Applicant: MITSUBISHI HEAVY INDUSTRIES, LTD., Tokyo (JP)

(72) Inventors: Masami Kamiya, Tokyo (JP); Ryoji Okabe, Tokyo (JP); Yoshinori Nonaka, Tokyo (JP); Kentaro Shindo, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 47 days.

(21) Appl. No.: 16/353,229

(22) Filed: Mar. 14, 2019

(65) Prior Publication Data
US 2019/0301285 A1    Oct. 3, 2019

(30) Foreign Application Priority Data

Mar. 29, 2018   (JP) ................. 2018-065687

(51) Int. Cl.
*F01D 5/14* (2006.01)
*F01D 5/28* (2006.01)
(Continued)

(52) U.S. Cl.
CPC ............ *F01D 5/147* (2013.01); *B29C 70/202* (2013.01); *B29C 70/30* (2013.01); *F01D 5/282* (2013.01);
(Continued)

(58) Field of Classification Search
CPC ....... F01D 5/147; F01D 5/282; B29C 70/202; B29C 70/30
See application file for complete search history.

(56) References Cited

U.S. PATENT DOCUMENTS 3,664,764 A  *  5/1972  Davies .................... F01D 5/282
                                                    416/224
3,679,324 A     7/1972  Stargardter
(Continued)

FOREIGN PATENT DOCUMENTS

CN     102317620      1/2012
CN     204552836      8/2015
(Continued)

OTHER PUBLICATIONS

Office Action dated Feb. 18, 2020 in corresponding Japanese Patent Application No. 2018-005687, with English-language translation.
(Continued)

*Primary Examiner* — David Hamaoui
*Assistant Examiner* — Brian O Peters
(74) *Attorney, Agent, or Firm* — Wenderoth, Lind & Ponack, L.L.P.

(57) ABSTRACT

A composite blade is formed by laying up composite material layers in which reinforcement fibers are impregnated with resin in a thickness direction of the blade. The composite blade includes a blade root on a base end side, an airfoil on a tip side, a first lay-up in which some composite material layers are laid up in the blade root so as to space parts of the composite material layers to form spacing parts and to extend from the distal toward the base end side in the thickness direction, and second lay-ups in which some composite material layers are laid up in the spacing parts so as to be lined up in the thickness direction. Among the second lay-ups, a second lay-up closer to a center side than to an outer side in the thickness direction is a larger distance from a proximal position to a top position.

8 Claims, 11 Drawing Sheets

(51) Int. Cl.
  *B29C 70/20* (2006.01)
  *B29C 70/30* (2006.01)
  *B29L 31/08* (2006.01)

(52) U.S. Cl.
  CPC ..... *B29L 2031/08* (2013.01); *F05B 2220/302* (2013.01); *F05D 2300/603* (2013.01)

(56) References Cited

U.S. PATENT DOCUMENTS

| | | | |
|---|---|---|---|
| 4,040,770 A | 8/1977 | Carlson | |
| 4,810,167 A | 3/1989 | Spoltman et al. | |
| 5,375,978 A | 12/1994 | Evans et al. | |
| 5,672,417 A | 9/1997 | Champenois et al. | |
| 8,100,662 B2 | 1/2012 | Schreiber | |
| 8,123,463 B2 * | 2/2012 | Kray | F01D 5/282 415/115 |
| 8,430,623 B2 * | 4/2013 | Beckford | F01D 5/14 415/9 |
| 9,068,559 B2 | 6/2015 | Hancock et al. | |
| 2005/0158171 A1 * | 7/2005 | Carper | C04B 35/565 415/200 |
| 2010/0028594 A1 | 2/2010 | Kray et al. | |
| 2011/0229337 A1 | 9/2011 | Carper et al. | |
| 2013/0028746 A1 | 1/2013 | Le Hong et al. | |
| 2013/0330496 A1 | 12/2013 | Kray et al. | |

FOREIGN PATENT DOCUMENTS

| | | |
|---|---|---|
| FR | 2016849 | 5/1970 |
| JP | 48-65507 | 9/1973 |
| JP | 52-80510 | 7/1977 |
| JP | 2005-201244 | 7/2005 |
| JP | 2010-38158 | 2/2010 |
| JP | 2015-525155 | 9/2015 |

OTHER PUBLICATIONS

Office Action dated Nov. 4, 2020 in corresponding Chinese patent application No. 201910196446.9, with English translation.

* cited by examiner

COMPOSITE BLADE AND METHOD OF MANUFACTURING COMPOSITE BLADE

CROSS-REFERENCE TO RELATED APPLICATIONS

The present application claims priority to and incorporates by reference the entire contents of Japanese Patent Application No. 2018-065687 filed in Japan on Mar. 29, 2018.

FIELD

The present invention relates to a composite blade and a method of manufacturing a composite blade.

BACKGROUND

Conventionally, there has been known a technique relating to a composite blade formed as a blade of a gas turbine by laying up composite material layers each obtained by impregnating reinforcement fiber with resin. For example, U.S. Pat. No. 8,100,662 discloses a composite blade including an airfoil and a blade root (dovetail) provided to a terminal of the airfoil. In this composite blade, composite material layers extending from the airfoil are formed such that parts of each adjacent two of the composite material layers are spaced apart from each other in the blade root, whereby the blade root extends outward as compared with the airfoil. Other composite material layers are additionally laid up in positions across each of which corresponding adjacent two of the composite material layers are spaced apart, which is intended to reduce ply drops, that is, regions containing no reinforcement fiber (regions containing only resin), and thus prevent the strength of the blade root from deteriorating.

The above-described composite blade according to Patent Literature 1 is formed such that the closed ends of the additionally-laid-up composite material layers are positioned in a transition area in which tensile stress and compressive stress occurring in the composite blade are switched from each other. Consequently, stress occurring in ply drops, which contain no reinforcement fiber but contain only resin, is reduced at the closed ends of composite material layers. However, no consideration is given to interlaminar shear stress in the composite material layers. Interlaminar shear stress is particularly high in the neighborhoods of the curving parts in the surface sides of the blade root, which increases the risk of incurring damage in a ply drop in an additionally-laid-up composite material layer positioned relatively near to the surface side. Therefore, a technique to prevent the strength of the blade root from deteriorating is called for.

SUMMARY

A composite blade according to an aspect of the present invention is a composite blade formed by laying up composite material layers in which reinforcement fibers are impregnated with resin in a thickness direction of the blade. The composite blade includes a blade root provided on a base end side and an airfoil provided on a tip side. The composite blade includes a first lay-up configured as a lay-up in which some of the composite material layers are laid up, the first lay-up being provided in the blade root so as to space parts of the composite material layers apart from each other starting from the base end side to form a plurality of spacing parts and so as to extend from the tip side toward the base end side in the thickness direction of the blade; and a plurality of second lay-ups each configured as a lay-up in which some of the composite material layers are laid up, the second lay-ups being provided in the spacing parts in the first lay-up in the blade root so as to be lined up in the thickness direction of the blade. Among the plurality of second lay-ups, a second lay-up closer to a center side than to an outer side in the thickness direction of the blade is a larger distance from a proximal position to a top position.

DETAILED DESCRIPTION

The following describes embodiments of a composite blade and a method of manufacturing a composite blade according to the present invention in detail based on the drawings. Those embodiments are not intended to limit the present invention.

First Embodiment

Figure 1:
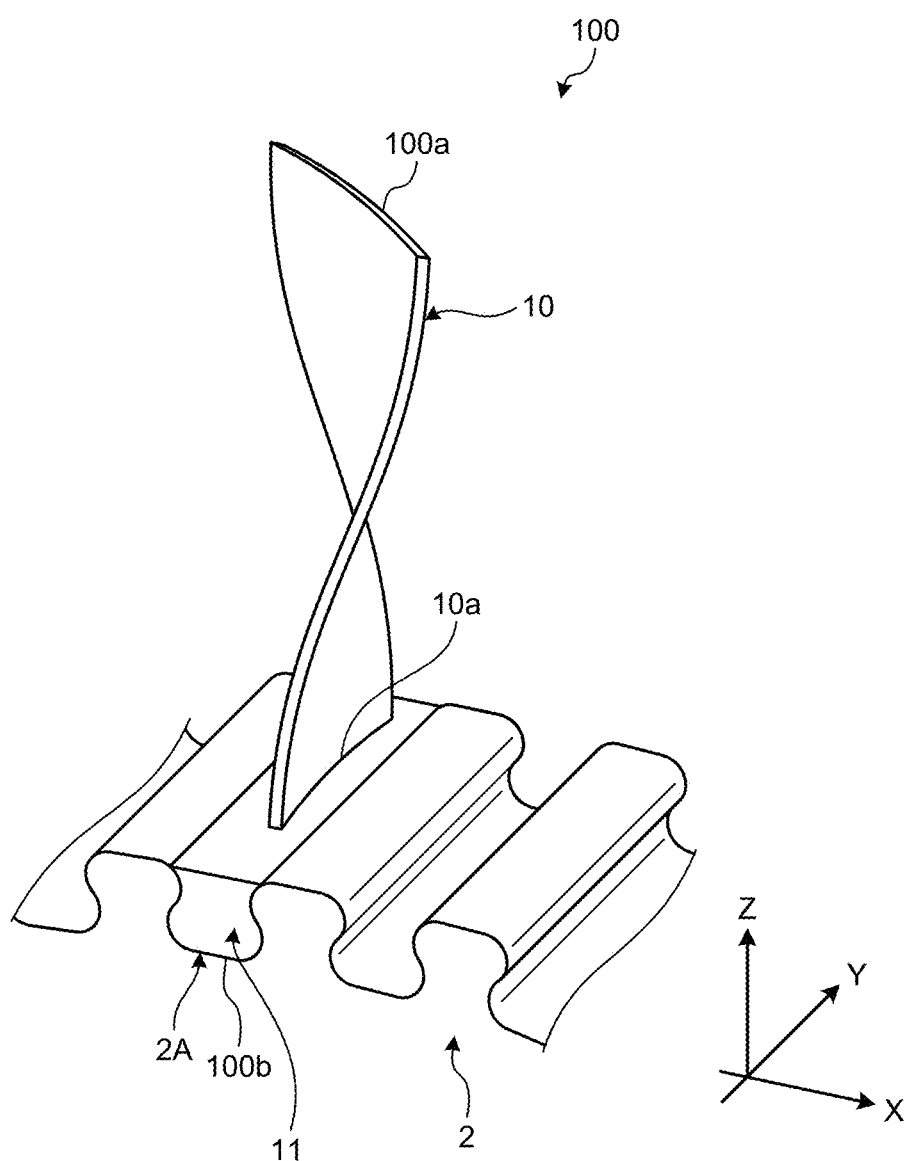
FIG. 1 is a schematic view roughly illustrating the general structure of a composite blade according to a first embodiment.

FIG. 1 is a schematic view roughly illustrating the general structure of a composite blade according to a first embodiment. The composite blade 100 according to the first embodiment is a blade of a gas turbine. A gas turbine for which the composite blade 100 is included is, for example, one included in an aircraft engine, but may be one for any purpose such as a power-generating gas turbine.

As illustrated in FIG. 1, the composite blade 100 extends from a tip 100*a* to a base end 100*b*. One side of the composite blade 100 that has the base end 100*b* is attached to a turbine disc 2. Here, a direction Z illustrated in FIG. 1 is a direction in which the composite blade 100 extends, that is, a direction from the tip 100*a* to the base end 100*b*. The direction Z is the longitudinal direction of the composite blade 100. The direction Z also corresponds to the radius direction (radial direction) of the turbine disc 2. A direction Y is a direction perpendicular to the direction Z, and also is a direction along the axial direction of the turbine disc 2. A direction X is a direction perpendicular to the direction Y and the direction Z, and also is a direction along a circumferential tangent line of the turbine disc 2.

The composite blade 100 includes an airfoil 10 and a blade root 11 (a dovetail part). The airfoil 10 is a blade that compresses gas flowing in the gas turbine with the rotation of the turbine disc 2. The airfoil 10 extends in a twisted form from the tip 100a to an airfoil end 10a in the direction Z (longitudinal direction) of the composite blade 100. The blade root 11 is provided to the airfoil end 10a, which is a terminal of the airfoil 10. The blade root 11 includes the base end 100b. In other words, the airfoil 10 extends in the direction Z from one side of the blade root 11 that faces the tip 100a. The composite blade 100 is attached to the turbine disc 2 via the blade root 11. The turbine disc 2 has a plurality of grooves 2A formed being spaced apart from each other in a circumferential direction with spaces. The blade root 11 is formed such that the length (width) thereof in the direction X is larger than the length of the airfoil 10 in the direction X. The composite blade 100 is attached and secure to the turbine disc 2 with the blade root 11 attached to one of the grooves 2A.

Figure 2:
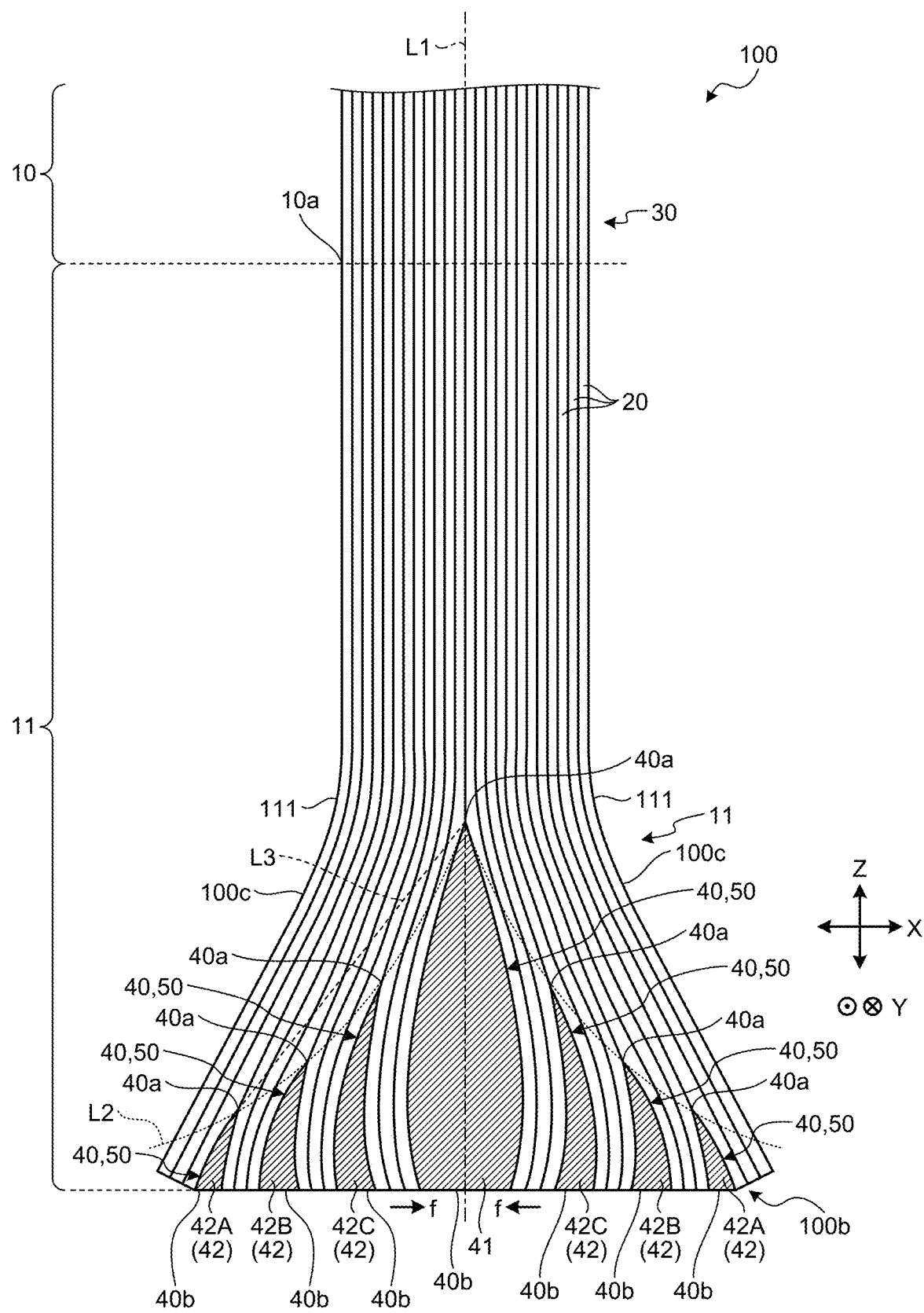
FIG. 2 is a sectional view of the composite blade as viewed from a direction Y.

FIG. 2 is a sectional view of the composite blade as viewed from the direction Y. The composite blade 100 is composed of lay-ups each obtained by laying up a plurality of composite material layers 20 in the thickness direction of the blade. As used herein, the term "thickness direction of the blade" refers to either of the thickness directions of the composite blade 100 in the airfoil end 10a, that is, a root part of the airfoil 10, the root part joining to the blade root 11. Thus, the term means the direction X (the left-to-right or right-to-left direction in FIG. 2). The following description uses the term "direction X" instead of using the term "thickness direction of the blade". The following description also uses the term "outer side" to mean a part of the composite blade 100 that is relatively near to either of the surfaces 100c in the direction X and uses the term "center side" to mean a part of the composite blade 100 that is relatively near to the centerline L1 in the direction X.

Figure 3:
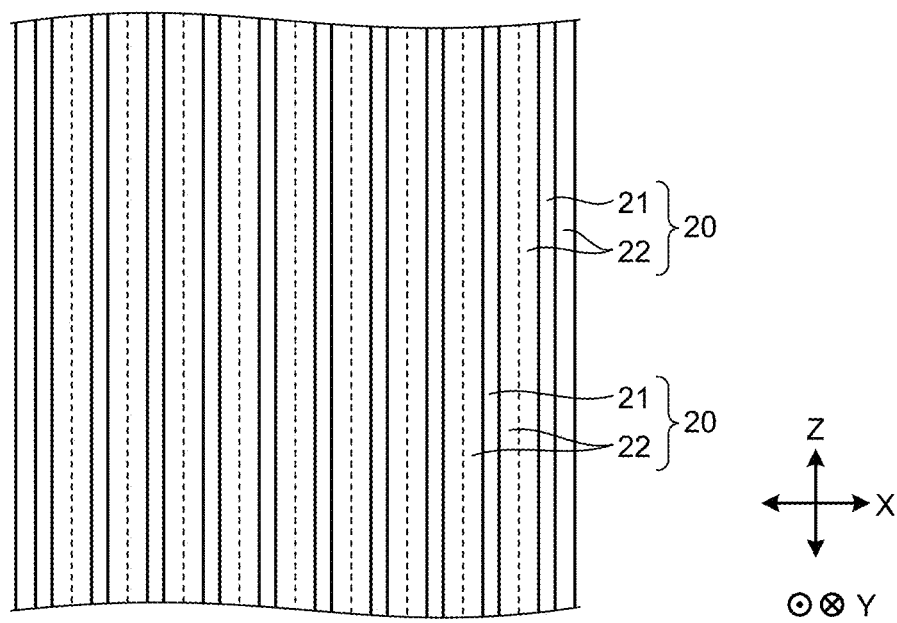
FIG. 3 is a schematic view illustrating the configuration of the composite material layers.

FIG. 3 is a schematic view illustrating the configuration of the composite material layers. Each of the composite material layers 20 is a layer made of composite materials that is obtained by impregnating reinforcement fiber 21 with resin 22. As illustrated in FIG. 3, each of the composite material layers 20 has a plurality of strands of reinforcement fiber 21 provided in the direction Z and has the periphery of the reinforcement fiber 21 filled with the resin 22. Each of the composite material layers 20 has the resin 22 therein bonded to the resin 22 in adjacent ones (those laid up thereon) of the composite material layers 20, thereby being integrated with the other composite material layers 20. Thus, the composite material layer 20 is a layer that contains the reinforcement fiber 21 and the resin 22 covering the periphery of the reinforcement fiber 21. The composite material layer 20 may include other reinforcement fiber that extends in a direction different from the direction in which the reinforcement fiber 21 illustrated in FIG. 3 extends. In such a case, the reinforcement fiber 21 may have that other reinforcement fiber woven therein.

In the first embodiment, the reinforcement fiber 21 is carbon fiber reinforced plastic (CFRP), which contains carbon fiber. The reinforcement fiber 21, however, is not limited to carbon fiber, and may be other plastic fiber, glass fiber, or metallic fiber. The resin 22 is, for example, thermosetting resin or thermoplastic resin. Examples of thermosetting resin applicable herein include epoxy resin. Examples of thermoplastic resin applicable herein include polyetheretherketone (PEEK), polyetherketoneketone (PEKK), and polyphenylenesulfide (PPS). The resin 22 is not limited to these examples and may be other resin.

The composite blade 100 thus includes the first lay-up 30 having the plurality of composite material layers 20 laid up in the direction X and the second lay-ups 40. In FIG. 2, a lay-up in a range not shaded with hatched lines corresponds to the first lay-up 30, and lay-ups in a range shaded with hatched lines correspond to the second lay-ups 40. The configurations of the first lay-up 30 and the second lay-ups 40 are described next in detail.

First Lay-Up 30

As illustrated in FIG. 2, the first lay-up 30 extends continuously from the airfoil 10 to the blade root 11. In the airfoil 10, the first lay-up 30 extends in the longitudinal direction thereof. In the blade root 11, however, the first lay-up 30 has a plurality of spacing parts 50 formed across each of which adjacent ones of some of the composite material layers 20 are spaced apart from each other starting from the base end 100b. Thus, in the blade root 11, the first lay-up 30 extends in a direction inclining outward in the direction X as the first lay-up 30 is further away from the airfoil 10. That is, in the blade root 11, the first lay-up 30 is provided so as to be wider in the direction X as it extends from the tip 100a to the base end 100b. In FIG. 2, each of the spacing parts 50 is formed each time the three composite material layers 20 are laid up, the number of composite material layers 20 to be laid up between adjacent ones of the spacing parts 50 is formed can be determined as desired in accordance with factors such as the size of the composite blade 100, the thickness of each of the composite material layers 20, and the number of spacing parts 50 to be formed.

Second Lay-Up 40

The plurality of second lay-ups 40 are provided in the blade root 11 while being arranged between some adjacent ones of the composite material layers 20 in the first lay-up 30 and lined up in the direction X. The second lay-ups 40 are additional lay-ups each of which is disposed between a corresponding one of the spacing parts 50 formed in the first lay-up 30. Thus, the shape of each of the spacing parts 50 in the first lay-up 30 coincides with the shape of a corresponding one of the second lay-ups 40 that are disposed. The second lay-ups 40 are provided in a part in the blade root 11 and closer to the base end 100b than curving parts 111 are, which are parts from which the first lay-up 30 starts inclining outward in the X direction as compared with the airfoil 10, as illustrated in FIG. 2.

Figure 4:
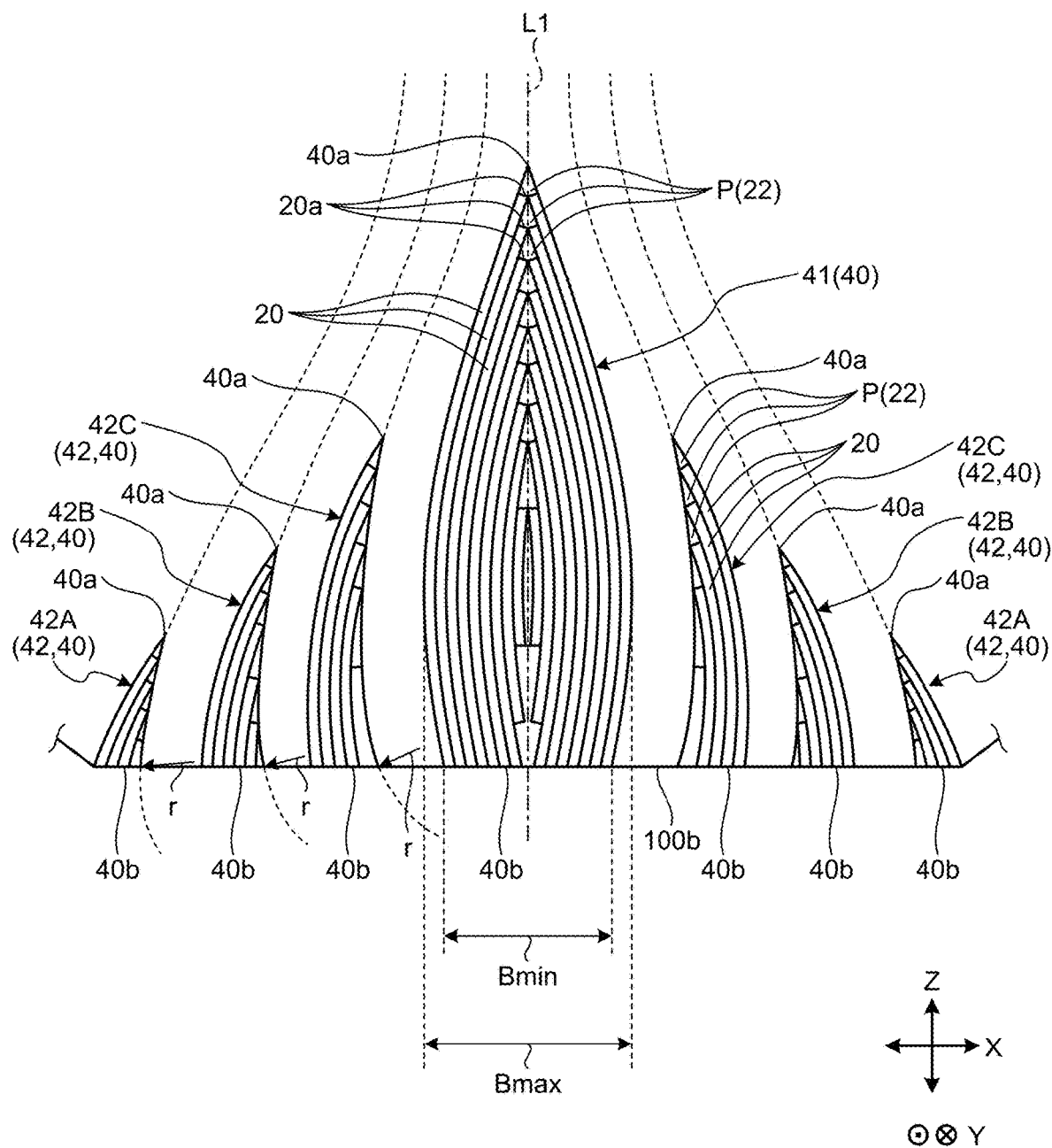
FIG. 4 is an explanatory view illustrating a plurality of second lay-ups.

FIG. 4 is an explanatory view illustrating the plurality of second lay-ups. As illustrated therein, each of the second lay-ups 40 is formed by laying up two or more of the composite material layers 20 in the direction X. In the second lay-up 40, each of the composite material layers 20 is configured as a layer that includes the reinforcement fiber 21 and the resin 22, as is illustrated in FIG. 3. Thus, FIG. 4 omits illustration of the reinforcement fiber 21 and the resin 22 included in each of the composite material layers 20. However, ply drops P, which are regions containing only the resin 22, are formed between adjacent ones of the respective closed ends 20a of the composite material layers 20. The number of second lay-ups 40 to be laid up is not limited to the example illustrated in FIG. 4 and may be determined as desired in accordance with factors such as the size of the composite blade 100, the thickness of each of the composite material layers 20, and the number of spacing parts 50 to be formed. Each of the second lay-ups 40 is formed such that, while the composite material layer 20 therein that is positioned closer to the center side in the direction X is formed to have a shorter length in the direction Z, the composite material layer 20 therein that is positioned closer to either of the outer sides in the direction X is formed to have a longer length in the direction Z, as illustrated in FIG. 4. In addition, each of the second lay-ups 40 has a convex shape in an end 40a thereof toward the tip 100a (in the upper side thereof in FIG. 4) and has an opposite end 40b thereof forming a part of the base end 100b of the composite blade 100.

The plurality of the second lay-ups 40 include a central lay-up 41 and a plurality of outer lay-ups 42, as illustrated in FIG. 4 and FIG. 2. The central lay-up 41 is disposed at the center of the composite blade 100 in the direction X. The central lay-up 41 is disposed overlapping the centerline L1 in the direction X of the composite blade 100. The central lay-up 41 has the longest length in the direction Z among the plurality of second lay-ups 40. The central lay-up 41 also has the largest thickness in the direction X among the plurality of second lay-up 40. Furthermore, the central lay-up 41 has a shape extending outward in the direction X and then narrowing toward the center side in the direction X from the end 40a toward the opposite end 40b. That is, as viewed from the Y direction, the cross-sectional shape of the central lay-up 41 is a barrel-like cross-sectional shape and symmetric about the centerline L1.

The outer lay-ups 42 are disposed closer to the corresponding outer sides in the direction X than the central lay-up 41 is. In the first embodiment, three outer lay-ups 42 are disposed facing either of both sides of the central lay-up 41, but the number of outer lay-ups 42 is not limited to this. Here, these three outer lay-ups 42 are referred to as the outer lay-ups 42A, 42B, and 42C in order from the outer side toward the center side in the direction X.

The outer lay-ups 42A, 42B, and 42C are formed so as to have shorter lengths in the direction Z than the central lay-up 41. In other words, among the plurality of second lay-ups 40, a second lay-up closer to a center side than to an outer side in the thickness direction of the blade is a larger distance from a proximal position to a top position in the direction Z, and a difference in the distance between adjacent second lay-ups is larger as the second lay-ups are closer to the center side than to the outer side in the thickness direction of the blade. The outer lay-ups 42A, 42B, and 42C are also formed so as to have shorter lengths in the direction Z toward the outer side in the direction X. The outer lay-ups 42A, 42B, and 42C are formed so as to have larger thicknesses in the direction than the central lay-up 41 and larger thicknesses in the direction X toward the center side in the direction X. Each of the outer lay-ups 42A, 42B, and 42C has a shape curved from the end 40a to the opposite end 40b with a contour convex outward in the direction X. That is, as viewed from the direction Y, each of the outer lay-ups 42A, 42B, and 42C has a cross-sectional shape curved in a manner bulging outward in the direction X. Furthermore, the outer lay-ups 42A, 42B, and 42C are formed so as to have smaller curvature radiuses r at the opposite ends 40b toward the center side in the direction X, as indicated by a broken line extending opposite from the corresponding opposite end 40b in FIG. 4. That is, the outer lay-up 42 that is disposed closer to the center side in the direction X is more sharply curved. Thus, among the composite material layers 20 in the first lay-up 30 that extend on the peripheries of the outer lay-ups 42, one that is closer to the center side in the direction X also is more sharply curved.

With the plurality of second lay-ups 40 thus configured, as indicated by broken lines in FIG. 2, lines L2 connecting corresponding ends 40a thereof that face the tip 100a extend toward the tip 100a (upward in the drawing) as they run from the corresponding outer sides toward the center side in the direction X. That is, each of the lines L2 has a mound shape on a cross-section as viewed from the direction Y. In the first embodiment, the line L2 is formed in a manner curved from the corresponding outer side toward the center side in the direction X on a path that is convex away from the airfoil 10. In other words, the line 12 extends on a path that runs closer to the base end 100b than a straight line 13 that connects the end 40a of the corresponding outer lay-up 42A disposed closest to the outer side in the direction X and the end 40a of the central lay-up 41 disposed closest to the center side in the direction X.

Figure 5:
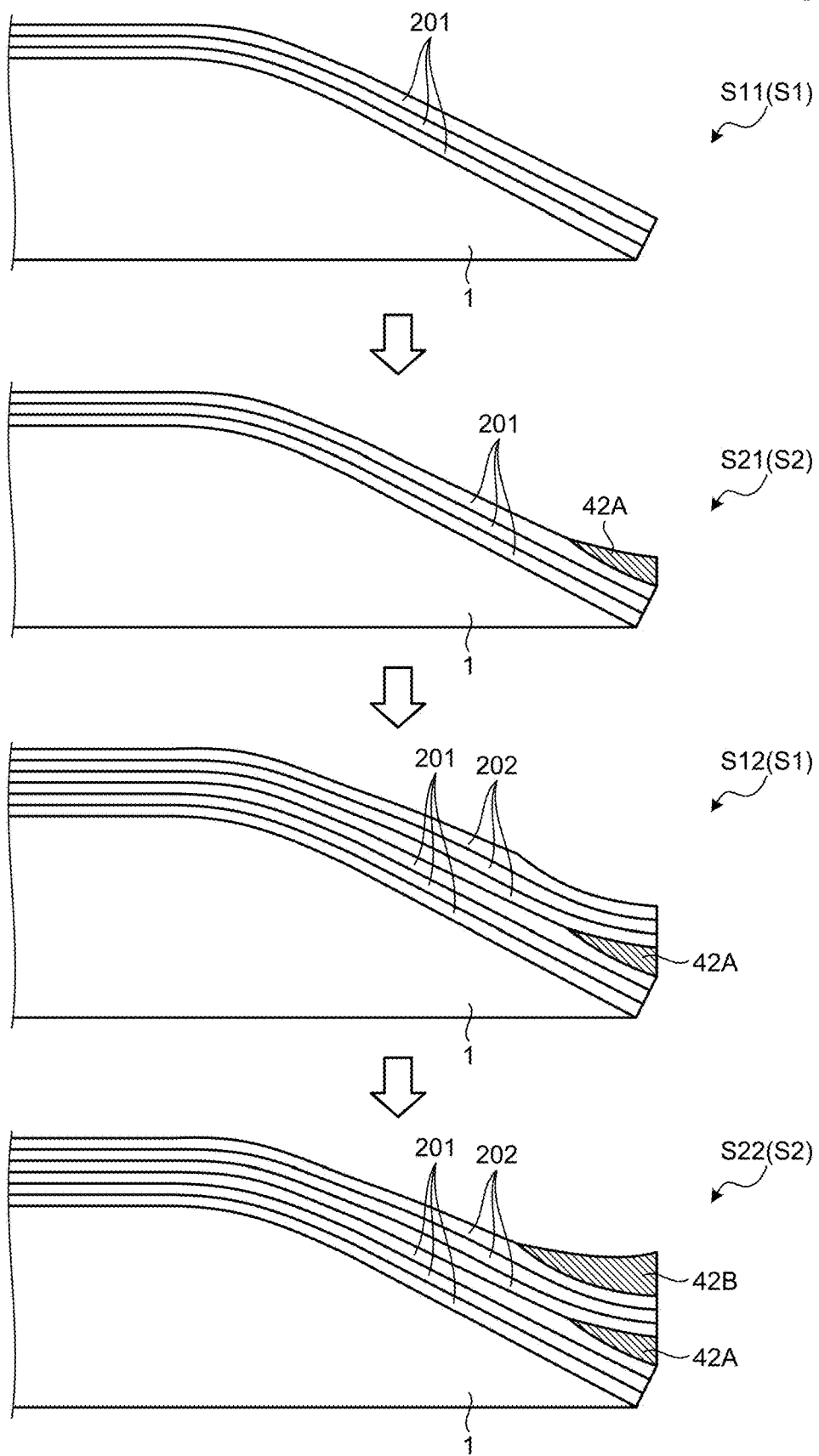
FIG. 5 is an explanatory view illustrating the procedure of a method of manufacturing a composite blade according to the first embodiment.
Figure 6:
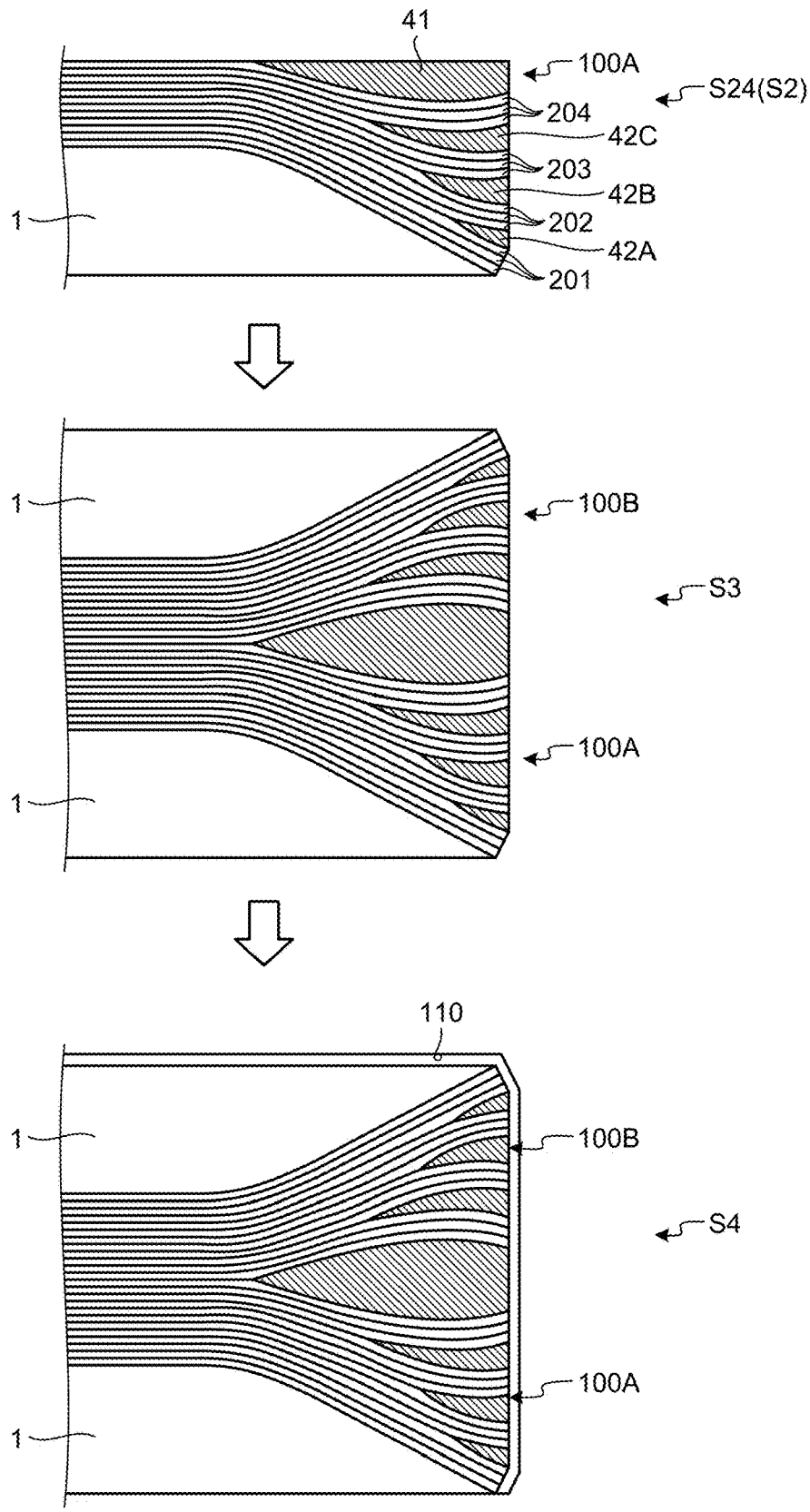
FIG. 6 is an explanatory view illustrating the procedure of the method of manufacturing a composite blade according to the first embodiment.

The procedure of a method of manufacturing a composite blade according to the first embodiment is described next. FIG. 5 and FIG. 6 are explanatory views illustrating the procedure of the method of manufacturing a composite blade according to the first embodiment. The procedure of the method or manufacturing the composite blade according to the first embodiment includes a first lay-up forming step S1, a second lay-up forming step S2, a mold setting step S3, and a curing step S4.

The procedure of the method of manufacturing a composite blade according to the first embodiment includes, at the beginning, repeatedly performing the first lay-up forming step S1 and the second lay-up forming step S2 to separately form respective halves of the composite blade 100, which are lay-ups 100A and 100B (see FIG. 6). The following description refers to the first lay-up forming step S1 and the second lay-up forming step S2 that are performed for the n-th time as a first lay-up forming step S1n and a second lay-up forming step S2n. The following description also refers to the composite material layers 20 that are laid up at the first lay-up forming Step S1n performed for the n-th time as composite material layers 20n. At the first lay-up forming step S1n and the second lay-up forming step S2n, the composite material layers 20 have the resin 22 not yet cured, that is, are in the prepreg state.

The first lay-up forming step S1 is a step of forming a part of the first lay-up 30 by laying up the composite material layers 20 to a location at which a corresponding one of the above-described spacing parts 50 is formed in each step of a stepwise process. More specifically, firstly, at the first lay-up forming step S11 that is to be performed for the first time, the plurality of composite material layer 201 are laid up on a base 1, as illustrated in FIG. 5.

Subsequently, the second lay-up forming step S21 is performed as such step that is to be performed for the first time. The second lay-up forming step S2 is a step of, each time the first lay-up forming step S1 is performed, laying up the composite material layers 20 for forming the corresponding second lay-up 40 on the composite material layers 20 that have been laid up at the first lay-up forming step S1 performed immediately before. At the second lay-up forming step S21 to be performed for the first time, the outer lay-up 42A to be disposed closest to the outer side in the direction X is laid up on the composite material layers 201 laid up on the base 1, as illustrated in FIG. 5. In the outer lay-ups 42, the composite material layer 20 that is positioned closer to the outer side in the direction X has a longer length in the direction Z, as illustrated in FIG. 4. Thus, each time the second lay-up forming step S2n is performed, the composite material layers 20 may be laid up in descending order of length in the direction Z.

Subsequently, the first lay-up forming step S12 is performed as such step that is to be performed for the second time. At the first lay-up forming step S12 to be performed for the second time, the composite material layers 202 are newly laid up on the composite material layers 201 and the outer lay-up 42A, as illustrated in FIG. 5. Furthermore, the second lay-up forming step S22 is performed as such step that is to be performed for the second time. At the second lay-up forming step S22 that is performed for the second time, the outer lay-up 42B to be disposed second closest to the outer side in the direction X is laid up on the composite material layers 202, as illustrated in FIG. 5.

These steps are repeated, so that the composite material layers 20 constituting the first lay-up 30 and the outer lay-ups 42 that are the second lay-ups 90 are laid up in order. As a result, the composite material layer 201, 202, 203, and 204 that constitute the first lay-up 30 and the outer lay-ups 42A, 42B, and 42C are laid up, as illustrated in FIG. 6. Thereafter, at the second lay-up forming step S24 performed lastly (for the fourth time in the present embodiment), layers corresponding to half of the central lay-up 41 are laid up on the composite material layers 204. The lay-up 100A corresponding half of the composite blade 100 in the direction X is thus formed. Thereafter, the lay-up 100B corresponding half of the composite blade 100 in the direction X is formed in the same manner.

Thereafter, as illustrated in FIG. 6, the lay-up 100A and the lay-up 100B, which are halves formed individually of the composite blade 100, at the mold setting step S3. After the completion of the mold setting step S3, the curing step S4 is performed. The curing step S4 is a step of forming the shape of the composite blade 100 by curing the resin 22 not yet cured in the lay-up 100A and the lay-up 100B, the respective shapes of which have been matched. At the curing step S4, the resin 22 is cured, for example, in a manner such that the composite blade 100 in an uncured state is covered with a bagging material 110, subjected to vacuuming, and then pressurized and heated in an autoclave. This completes production of the composite blade 100. At the curing step S4, an applicable method is not limited to this and any method that enables curing of the resin 22 and formation of a cured body of the composite blade 100 may be applied.

As described above, according to the composite blade 100 and the method of manufacturing a composite blade according to the first embodiment, the respective second lay-ups 40 are disposed in the spacing parts 50 in the first lay-up 30 in the blade root 11. Even with the blade root 11 extending outward in the direction X (thickness direction of the blade), this configuration can minimize regions that contain no reinforcement fiber 21, whereby the strength of the blade root 11 can be enhanced.

Figure 7:
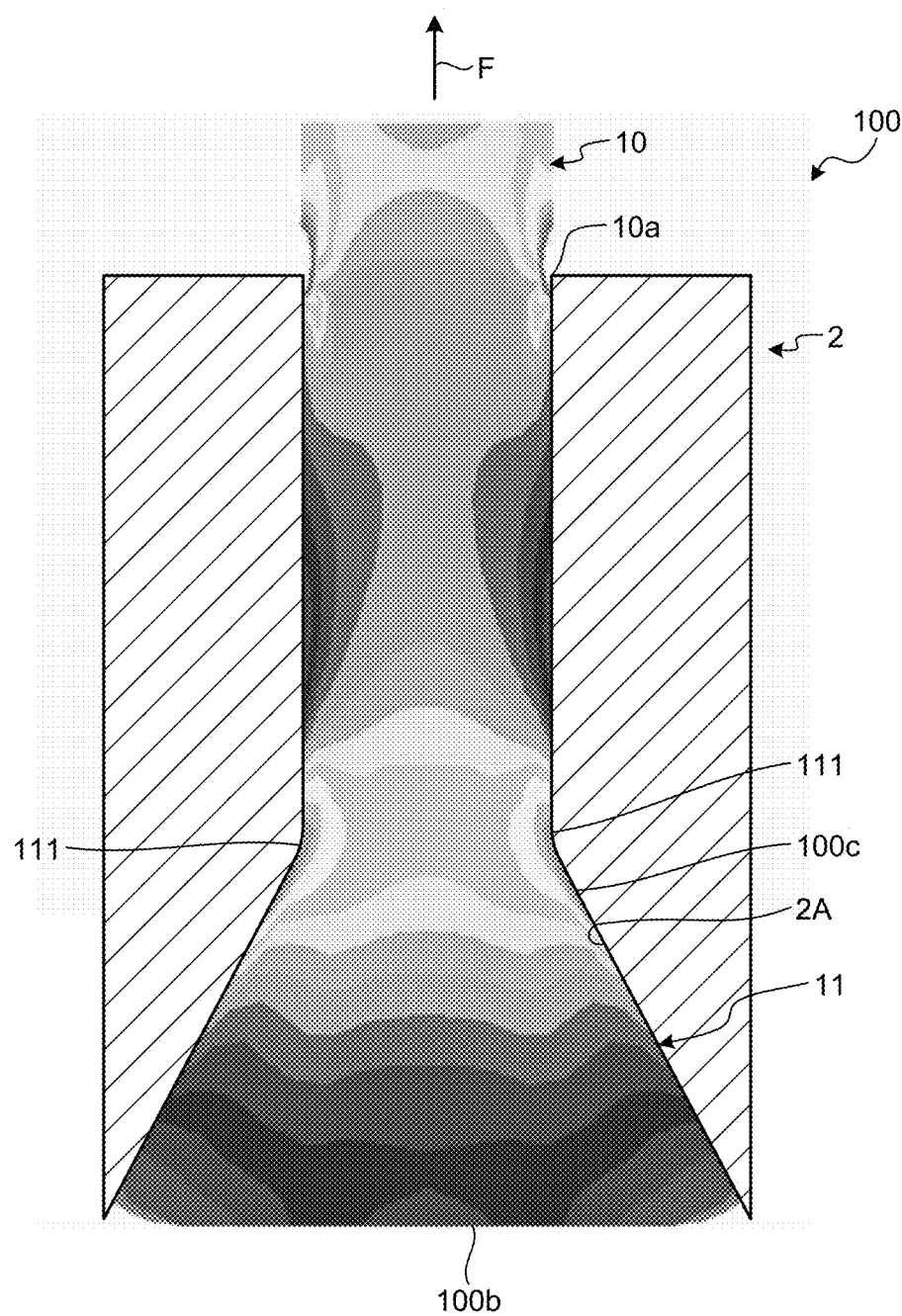
FIG. 7 is an explanatory view illustrating an example of the result of analysis on the distribution of Von Mises stress generated in the composite blade according to the first embodiment.
Figure 8:
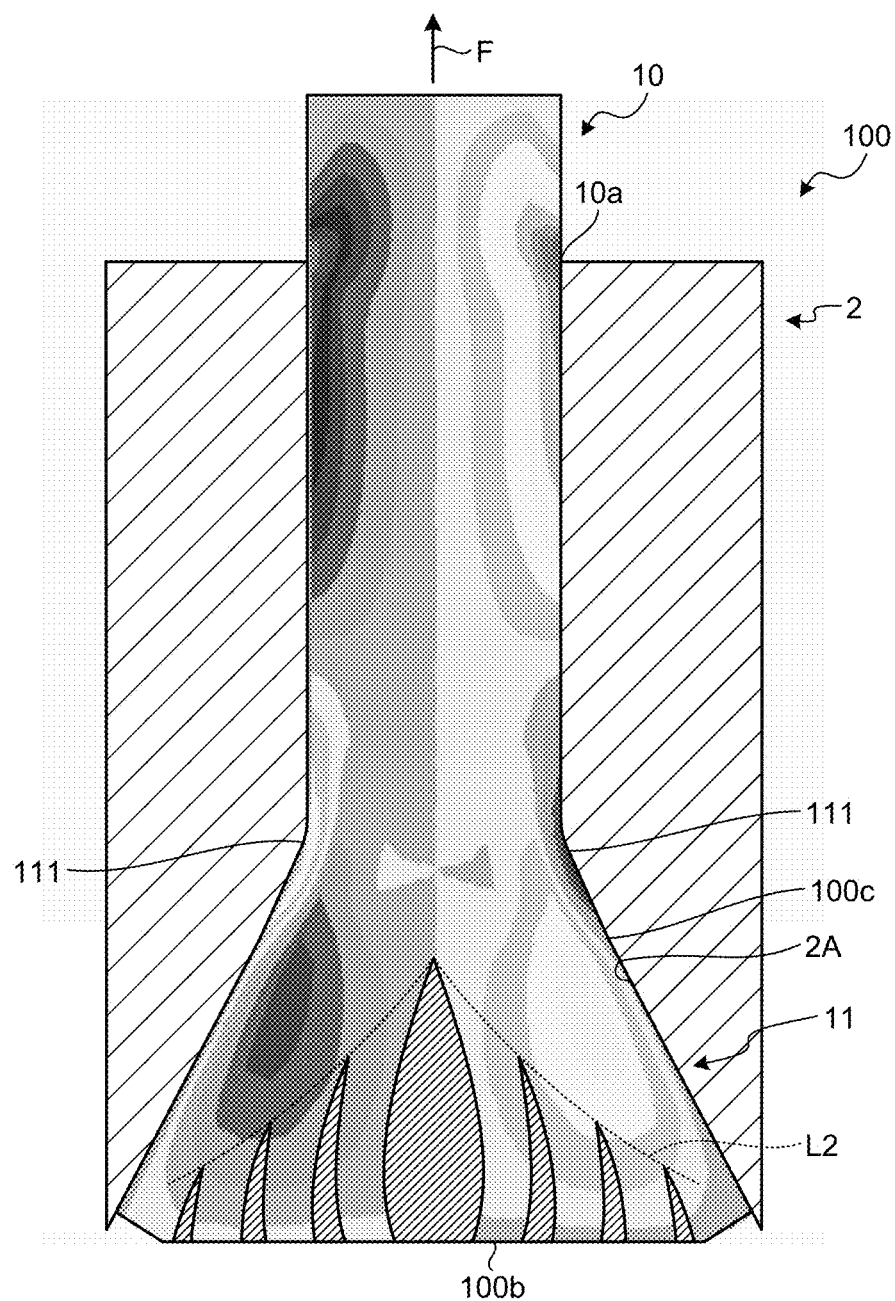
FIG. 8 is an explanatory view illustrating an example of the result of analysis on the distribution of interlaminar shear stress generated between adjacent composite material layers in the composite blade according to the first embodiment.

FIG. 7 is an explanatory view illustrating an example of the result of analysis on the distribution of Von Mises stress generated in the composite blade according to the first embodiment, and FIG. 8 is an explanatory view illustrating an example of the result of analysis on the distribution of interlaminar shear stress generated between adjacent composite material layers in the composite blade according to the first embodiment. FIG. 7 and FIG. 8 are results obtained by analyzing, with models for the composite blade 100, the stress distribution observed with centrifugal force F in the direction Z acting on condition that the blade root 11 is securely held by the groove 2A of the turbine disc 2. With the centrifugal force F acting in the model for the composite blade 100, Von Mises stress and interlaminar shear stress increase in the neighborhoods of curving parts 111 in parts that are relatively near to either of the surface 100c of the blade root 11.

In the composite blade 100, the lines 12 connecting the corresponding ends 40a of the corresponding second lay-ups 40 that face the tip 100a are formed so as to extend toward the tip 100a as they run from the corresponding outer sides toward the center side in the direction X. That is, the second lay-up 40 that is disposed closer to each of the outer sides in the direction X is shorter. In other words, among the plurality of second lay-ups 40, a second lay-up closer to a center side than to an outer side in the thickness direction of the blade is a larger distance from a proximal position to a top position in the direction Z, and a difference in the distance between adjacent second lay-ups is larger as the second lay-ups are closer to the center side than to the outer side in the thickness direction of the blade. Thus, the individual second lay-ups 40 can be disposed apart from regions in which particularly high Von Mises stress and interlaminar shear stress tend to occur, that is, the neighborhoods of the curving parts 111 on the surface 100c of the blade root 11. As a result, stress generated at ply drops P (see FIG. 4) in each of the second lay-ups 40 is decreased, which makes it less likely to have damage that originates from the ply drops P. Therefore, the composite blade 100 and the method of manufacturing a composite blade according to the first embodiment can prevent the strength of the blade root 11 from deteriorating.

Each of the lines L2 is curved on a path that is convex toward the base end 100b in a range from the corresponding outer side to the center side in the direction X.

With this configuration, the individual second lay-ups 40 can be disposed more apart from regions in which particularly high Von Mises stress and interlaminar shear stress tend to occur, that is, the neighborhoods of the curving parts 111 in the blade root 11.

Among the plurality of second lay-ups 40, one that is disposed closer to the center side in the direction X has a larger thickness in the direction X (thickness direction of the blade) than another that is disposed closer to either of the outer sides in the direction X.

With this configuration, the composite material layers 20 in the first lay-up 30 can be declined outward to a large extent in the X direction along the respective shapes of the second lay-ups 40, among which one that is disposed closer to the center side in the direction X is formed so as to be taller and thicker. When centrifugal force F acts on the composite blade 100, the blade root 11 supports the composite blade 100 against the centrifugal force F with surface traction received on the surfaces 100c from the groove 2A of the turbine disc 2 and with interlaminar shear loads acting between the composite material layers 20. In this condition, with a larger declining angle of the surface 100c, the blade root 11 can receive greater surface traction from the groove 2A, and, at the same time, component forces due to the interlaminar shear loads can be smaller. Therefore, the composite blade 100 reduces the interlaminar shear loads acting between the composite material layers 20 and thus can further reduce the risk of incurring damage between the composite material layers 20.

Furthermore, the second lay-ups 40 include the central lay-up 41, which is disposed at the center thereof in the direction X and is formed extending outward from the end 40a in the direction X and inward to the opposite end 40b in the direction X.

With this configuration, parts of the first lay-up 30 that extend on the periphery of the central lay-up 41 have, in one side of the first lay-up 30 toward the opposite ends 40b, shapes extending toward the center side in the direction X. Thus, in one side of the first lay-up 30 and the central lay-up 41 toward the opposite ends 40b, force f (see FIG. 2) in a direction that compresses the central lay-up 41 acts to the central lay-up 31 from the parts of the first lay-up 30 that extend on the periphery thereof. As a result, interlaminar shear stress occurs to the interfaces between the above parts of the central lay-up 41 and the first lay-up 30, and the interlaminar shear stress in one side toward the ends 40a and in the other side toward the opposite ends 40b acts in opposite directions, whereby the central lay-up 41 receives force that presses the central lay-up 41 toward the tip 100a (upward in the drawing). The central lay-up 41 can be thus held by the parts of the first lay-up 30 that are on the periphery thereof, and the central lay-up 41 can be prevented from coming off from the blade root 11 even when damage occurs to the boundary between the central lay-up 41 and the first lay-up 30.

Moreover, the second lay-ups 40 include the plurality of outer lay-ups 42 disposed closer to the outer side in the direction X than the central lay-up 41 is. The plurality of outer lay-ups 42 are curved from the respective ends 40a thereof to the respective opposite ends 40b thereof with respective contours convex outward in the direction X, and the outer lay-up 42 that is disposed closer to the center side in the direction X has a smaller curvature radius r at the opposite end 40b thereof than the outer lay-up 42 that is disposed closer to the outer side in the direction X.

With this configuration, parts of the first lay-up 30 that extend on the periphery of each of the outer lay-ups 42 are also curved with contours convex outward in the direction X, and a part of the first lay-up 30 that is disposed closer to the center side in the direction X has a smaller curvature radius r (is more sharply curved). As a result, the parts of the first lay-up 30 that are disposed on the peripheries of the central lay-up 41 are most sharply curved, whereby the ratio of the maximum thickness Bmax (see FIG. 4) of the central lay-up 41 to the minimum thickness Bmin (see FIG. 4) thereof along the opposite end 40b can be made relatively large. Therefore, the central lay-up 41 is more favorably held by the parts of the first lay-up 30 that are on the periphery thereof, whereby the central lay-up 41 can be more favorably prevented from coming off from the blade root 11.

Second Embodiment

Figure 9:
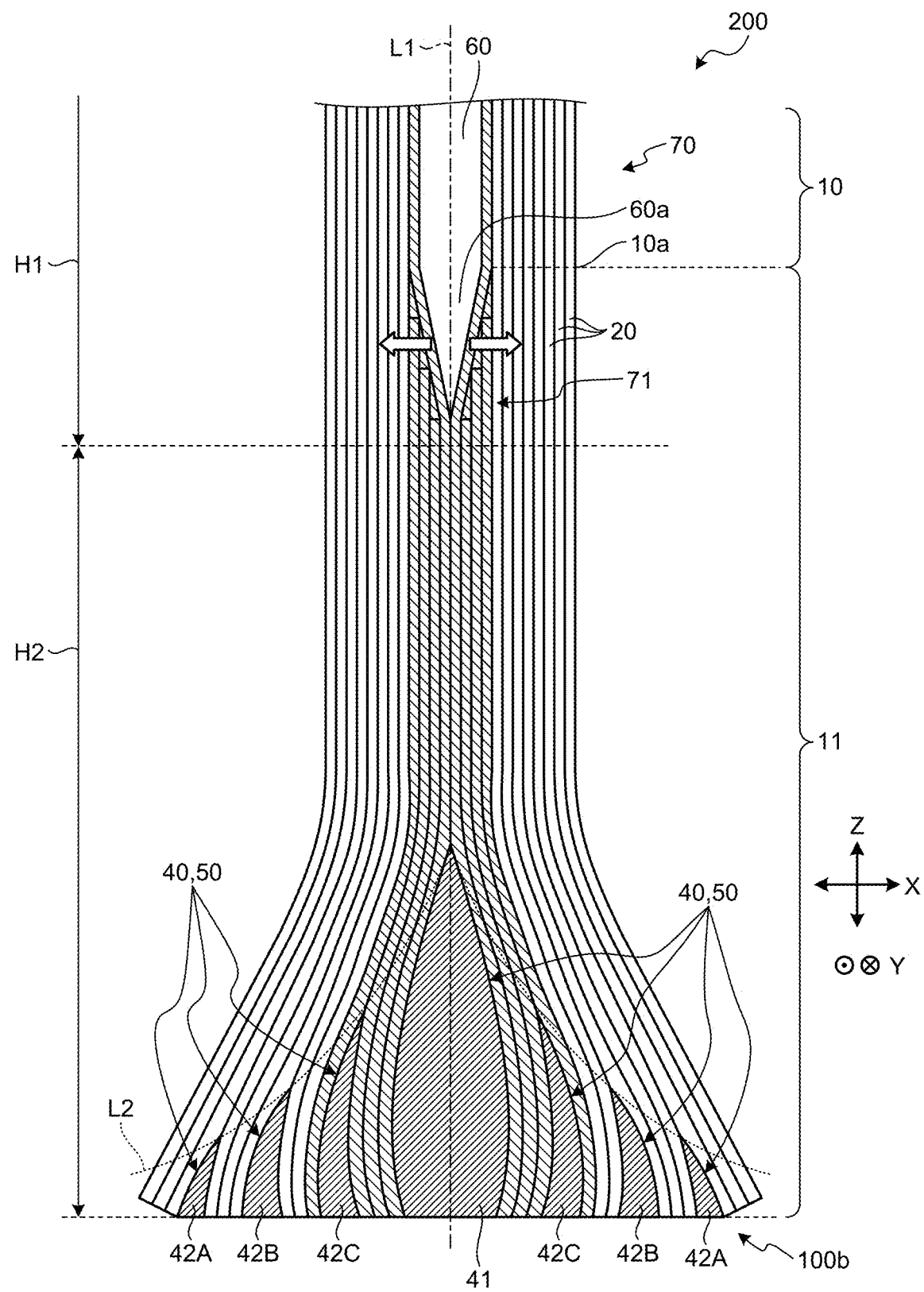
FIG. 9 is a sectional view of a composite blade according to a second embodiment as viewed from the direction Y.
Figure 10:
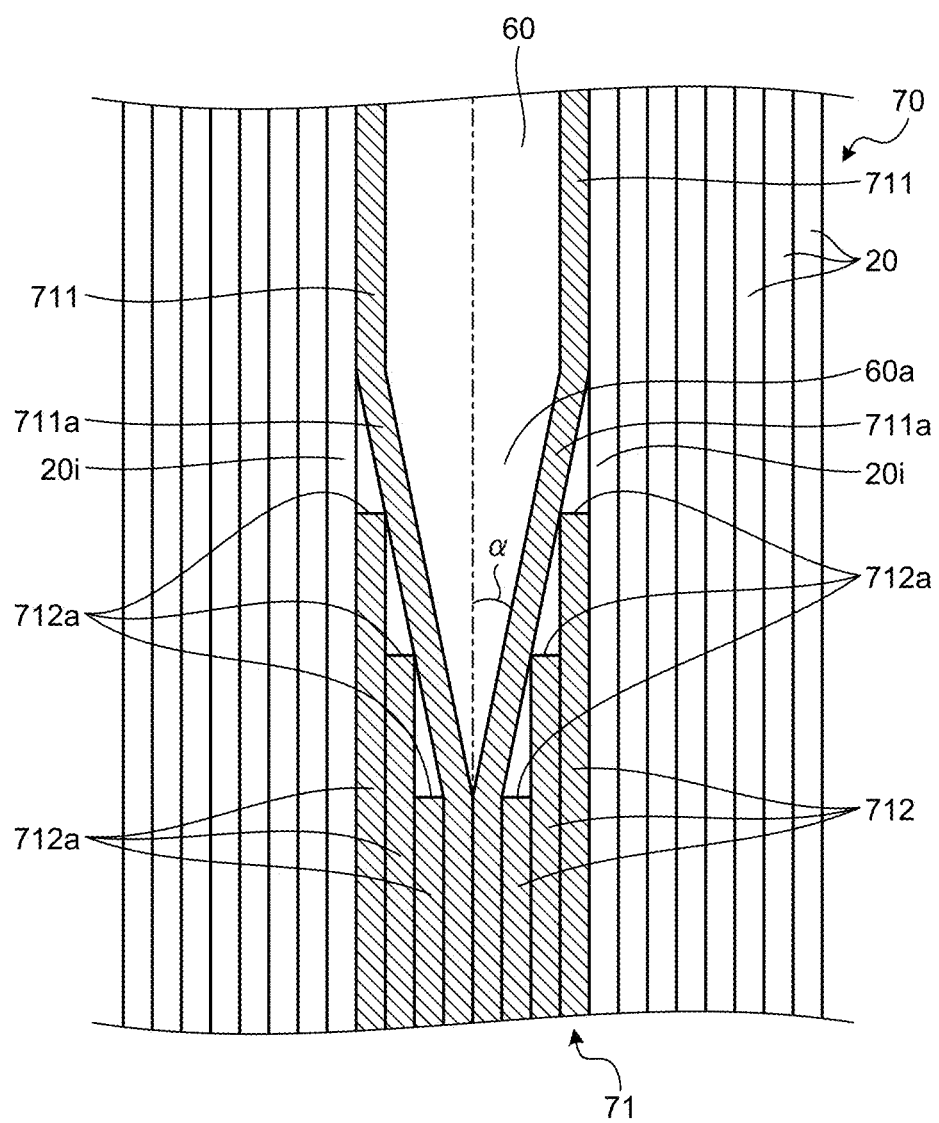
FIG. 10 is an enlarged sectional view of the main part of the composite blade according to the second embodiment.

A composite blade 200 according to a second embodiment is described next. While FIG. 9 is a sectional view of the composite blade according to the second embodiment as viewed from the direction Y, FIG. 10 is an enlarged sectional view of the main part of the composite blade according to the second embodiment. The composite blade 200 further includes a foam layer 60 in addition to the components of the composite blade 100 according to the first embodiment. The composite blade 200 includes a first lay-up 70 in place of the first lay-up 30 of the composite blade 100. The other components of the composite blade 200 are unchanged from the composite blade 100, and descriptions thereof are thus omitted with the same reference signs assigned thereto.

Foam Layer 60

The foam layer 60 is a layer formed of foaming resin. The foam layer 60 is formed by placing foaming resin on a cover layer 711 to be described later of the first lay-up 70 and then curing the foaming resin. The foam layer 60 is disposed at the center of the airfoil 10 in the direction X. The foam layer 60 is disposed in a position overlapping the centerline L1 of the composite blade 200. The foam layer 60 has a part thereof extending into the blade root 11.

The foam layer 60 is formed such that an end part 60a thereof in the blade root 11 has a wedge shape extending toward the base end 100b along a course of the end part 60a from each of the outer sides to the center side in the direction X. That is, the end part 60a of the foam layer 60 is formed in a rectangular shape that is convex toward the base end 100b, as illustrated in FIGS. 9 and 10. An inclination angle α of the end part 60a to the centerline L1 is determined in accordance with the position of the upper end of the end part 60a and the dimensions (the length in the direction Z and the thickness) of the end part 60a. The inclination angle α is preferably set to, for example, about 30 degrees.

Figure 11:
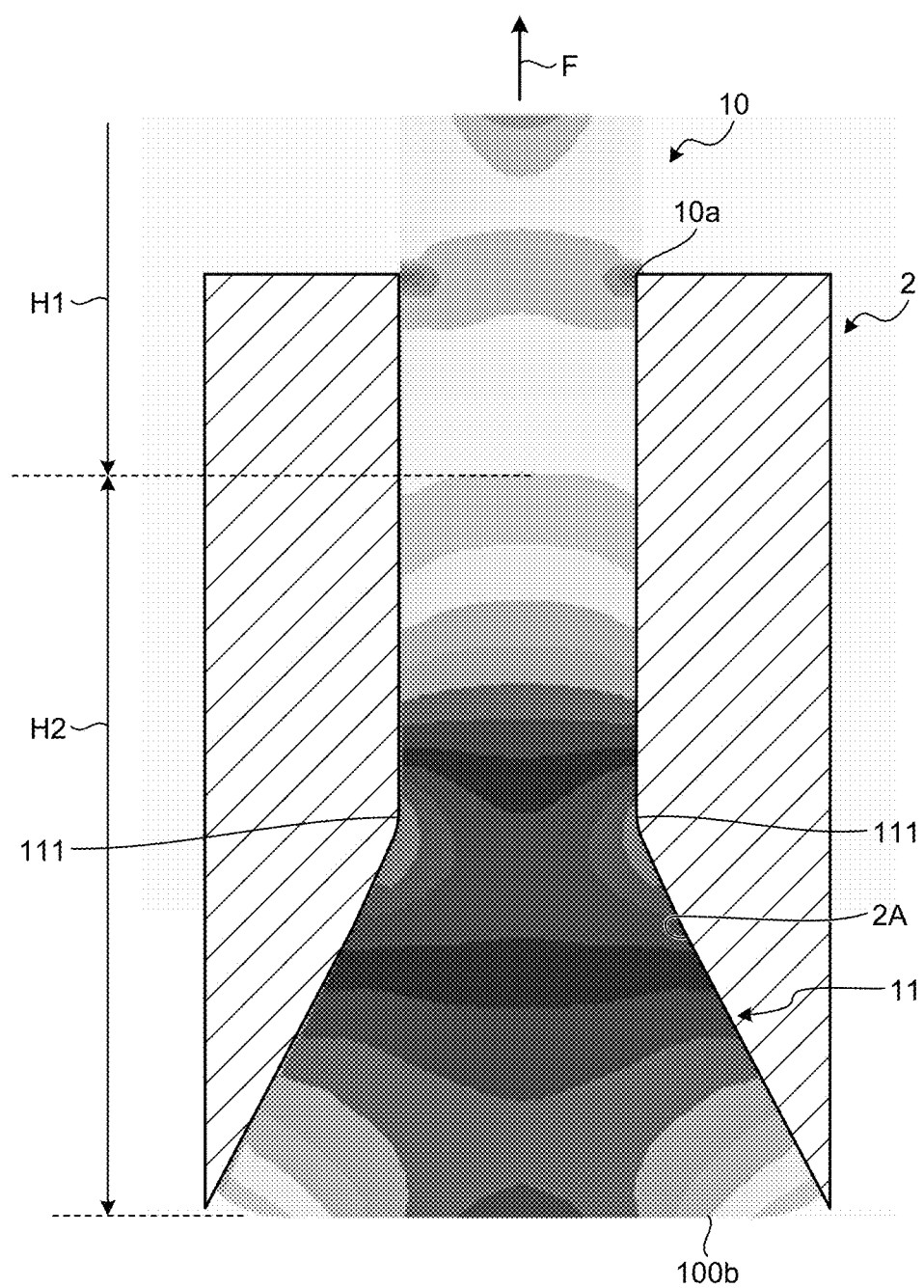
FIG. 11 is an explanatory view illustrating an example of the result of analysis on the distribution of stress generated in the composite blade according to the second embodiment.

The foam layer 60 has the end part 60a provided in a range H1, as illustrated an FIG. 9. Here, FIG. 11 is an explanatory view illustrating an example of the result of analysis on the distribution of stress generated in the composite blade according to the second embodiment. FIG. 11 is a result obtained by analyzing, with a model for the composite blade 200, the stress distribution observed with centrifugal force F in the direction Z acting on condition that the blade root 11 is securely held by the groove 2A of the turbine disc 2. The analysis result illustrated in FIG. 11 indicates that, in the range H1, tensile stress acts between the composite material layers 20. At the same time, a range H2, which is located closer to the base end 100b than the range H1 is, is found to be a range in which compressive stress acts between the composite material layers 20. As seen here, in the second embodiment, the end part 60a of the foam layer 60 is disposed in the range H1 in which tensile stress acts between the composite material layers 20. The end part 60a of the foam layer 60 may be provided in any position in the range H1, but is preferably provided in the neighborhood of the lower end of the range H1 in terms of reducing the weight of the composite blade 200.

First Lay-Up 70

The first lay-up 70 includes central layers 71 that extend from the end part 60a of the foam layer 60 toward the base end 100b in the blade root 11. In FIG. 9, a range shaded with hatched lines in the first lay-up 70 corresponds to the central layer 71. The other configurations of the first lay-up 70 are unchanged from the first lay-up 30, and descriptions thereof are thus omitted.

The central layers 71 include cover layers 711 and a plurality of outer layers 712. The cover layers 711 are layers disposed closest to the center side in the direction X among the composite material layer 20 included in the central layers 71. The cover layers 711, as illustrated in FIG. 9 and FIG. 10, are layers extending on the periphery of the foam layer 60 and also are layers extending from the base end 100b into the airfoil 10. The cover layers 711 are formed so as to cover one side of the foam layer 60 that faces the base end 100b. The outer layers 712 are adjacent to the cover layers 711 and include a plurality of layers (three layers in the second embodiment) laid up on each of the outer sides of the cover layers 711 in the direction X. The outer layers 712 extend from the base end 100b to positions at which the respective outer layers 712 reach the cover layer 711, as illustrated in FIG. 9. More specifically, the outer layers 712 have respective closed ends 712a thereof each abutting on an inclined part 711a of the corresponding cover layer 711, the inclined part 711a extending along the end part 60a of the foam layer 60, as illustrated in FIG. 10. Thus, the respective closed ends 712a of the outer layers 712 are prohibited from making direct contact with the end part 60*a* of the foam layer 60 because of the presence of the cover layers 711.

To manufacture the composite blade 200 configured as described above, a lay-up having the first lay-up 70, excluding the foam layer 60, and the second lay-ups 40 laid up therein in accordance with the procedure illustrated in FIG. 5 and FIG. 6. Thereafter, foaming resin is placed on the cover layers 711 and thermally cured, so that the foam layer 60 is formed. When the foam layer 60 is thus formed, parts of the first lay-up 70 that extend on the periphery of the end part 60*a* having a wedge shape can be pressed in a wide range in the process of heating and curing foaming resin, as schematically indicated by outlined arrows in FIG. 9. As a result, the generation of voids in the first lay-up 70 is prevented in the neighborhood of the airfoil end 10*a*, which is a root part of the airfoil 10, the root part joining to the blade root 11. Therefore, the strength of the airfoil 10 and the blade root 11 can be increased.

The end part 60*a* of the foam layer 60 has a wedge shape, which allows the foam layer 60 to press the central layers 71, and consequently allows the outer layers 712 that are positioned outermost in the direction X among the central layers 71 to be tightly firmly attached to respective composite material layers 201 (see FIG. 10) adjacent to these outer layers 712. As a result, when the centrifugal force F acts on the composite blade 200, force is stably transmitted between the composite material layers 20*i* and the central layers 71, and the central layers 71 and the second lay-ups 40 that extend on the periphery of the central layers 71 can be favorably burdened with the centrifugal force F. Furthermore, the end part 60*a* has a shape (a wedge shape) such that the boundary surfaces between the foam layer 60 and the central layer 71 gradually change, which allows stress concentration on the boundary surface between the foam layer 60 and the central layer 71 to be avoided when the centrifugal force F acts on the composite blade 200. As a result, the risk of incurring damage on the boundary surfaces can be reduced.

The foam layer 60 has the end part 60*a* thereof provided in the range H1 in which tensile stress acts between the composite material layers 20.

With this configuration, the foam layer 60 can be prevented from being crashed with a compressive load acting on the foam layer 60.

In addition, the central layers 71 that are the composite material layers 20 that are disposed closest to the center side in the direction X (thickness direction of the blade) are the cover layers 711, which extend into the airfoil 10 while extending on the periphery of the foam layer 60.

With this configuration, the closed ends 712*a* of the outer layers 712 (composite material layers 20) that are extend on the outer sides of the cover layers 711 of the central layers 71 can be kept out of contact with the end part 60*a* of the foam layer 60. As a result, when the foam layer 60 is formed, foaming resin can prevent a defect such that adjacent ones of closed ends 712*a* of the outer layer 712 among the central layers 71 are separated from each other. When the foam layer 60 is formed, this configuration also makes it possible to stabilize the shapes of boundary surfaces of and between the foam layer 60 and the central layers 71 because the respective closed ends 712*a* of the outer layers 712 (the other composite material layers 20) other than the cover layers 711 among the central layers 71 are pressed through the cover layers 711.

In the first embodiment and the second embodiment, the line L2 connecting the respective ends 40*a* of the second lay-ups 40 is curved with a contour convex toward the base end 100*b* from each of the outer sides to the center side in the direction X. However, the line L2 may be linear. That is, the line L2 may coincide with the straight line L3 FIG. 2.

In the first embodiment and the second embodiment, the second lay-ups 40 are formed thicker toward the center side in the direction X. However, the second lay-ups 40 may be formed in uniform thickness or may be formed so as to be thicker toward each of the outer sides in the direction X.

In the first embodiment and the second embodiment, the central lay-up 41 among the second lay-ups 40 is configured to have a barrel-shaped cross-sectional shape as viewed from the direction Y. However, the central lay-up 41 is not limited to this shape. The central lay-up 41 may have, for example, a rectangular cross-sectional shape as viewed from the direction Y.

In the first embodiment and the second embodiment, each of the outer lay-ups 42 among the second lay-ups 40 is configured to have a cross-sectional shape curved in a manner bulging to the corresponding outer side in direction X as viewed from the direction Y. However, the outer lay-ups 42 is not limited to this shape. Each of the outer lay-ups 42 may have, for example, a rectangular cross-sectional shape as viewed from the direction Y.

In the first embodiment and the second embodiment, the second lay-ups 40 are configured such that, while the composite material layer 20 therein that is positioned closer to the center side in the direction X has a shorter length in the direction Z, the composite material layer 20 therein that is positioned closer to either of the outer sides in the direction X has a longer length in the direction Z, as illustrated in FIG. 4. However, the second lay-ups 40 may be formed so that, while the composite material layers 20 therein have shorter lengths in the direction Z toward the center side in the direction X, the composite material layers 20 have longer lengths in the direction Z toward either of the outer sides in the direction X.

In the second embodiment, the end part 60*a* of the foam layer 60 is provided within the range H1 in which tensile stress acts between the composite material layers 20. If there is no possibility of having the foam layer 60 crashed, however, the end part 60*a* may be provided within the range H2 in which compressive stress acts between the composite material layers 20.

In the second embodiment, the central layers 71 in the first lay-up 70 include the cover layers 711. However, the cover layer 711 may be omitted.

REFERENCE SIGNS LIST

A composite blade according to an aspect of the present invention is a composite blade formed by laying up composite material layers in which reinforcement fibers are impregnated with resin in a thickness direction of the blade. The composite blade includes a blade root provided on a base end side and an airfoil provided on a tip side.

The composite blade includes a first lay-up configured as a lay-up in which some of the composite material layers are laid up, the first lay-up being provided in the blade root so as to space parts of the composite material layers apart from each other starting from the base end side to form a plurality of spacing parts and so as to extend from the tip side toward the base end side in the thickness direction of the blade; and a plurality of second lay-ups each configured as a lay-up in which some of the composite material layers are laid up, the second lay-ups being provided in the spacing parts in the first lay-up in the blade root so as to be lined up in the thickness direction of the blade. Among the plurality of second lay-ups, a second lay-up closer to a center side than to an outer side in the thickness direction of the blade is a larger distance from a proximal position to a top position.

With this configuration, the respective second lay-ups are disposed in the spacing parts between corresponding adjacent ones of the first lay-ups, which makes it possible to enhance the strength of the blade root by reducing regions containing no reinforcement fiber as far as possible even with the blade root extending outward in the thickness direction of the blade. In addition, a line connecting the respective ends of the second lay-ups is formed so as to extend toward the tip as the line runs from the outer side toward the center side in the thickness direction of the blade. That is, the second lay-up that is disposed closer to the outer side in the thickness direction of the blade is shorter. Thus, the individual second lay-ups can be disposed apart from regions in which particularly high interlaminar shear stress tends to occur, that is, the neighborhoods of the curving parts on the surfaces of the blade root. Consequently, stress occurring in ply drops in the second lay-ups can be alleviated, which makes it less likely to have damage that originates from the ply drops. Therefore, the present invention can provide a composite blade that prevents the strength of the blade root from deteriorating.

It is preferable that a difference in the distance between adjacent second lay-ups is larger as the second lay-ups are closer to the center side than to the outer side in the thickness direction of the blade.

With this configuration, the individual second lay-ups can be disposed in positions more apart from regions in which particularly high interlaminar shear stress tends to occur, that is, from the neighborhoods of the curving parts of the blade root.

It is preferable that out of the plurality of second lay-ups, a second lay-up that is disposed closer to the center side in the thickness direction of the blade has a larger thickness in the thickness direction of the blade than a second lay-up that is disposed closer to the outer side in the thickness direction of the blade.

With this configuration, the composite material layers in the first lay-up can be declined outward to a large extent in the X direction along the respective shapes of the second lay-ups 40, among which one that is disposed closer to the center side in the direction X is formed so as to be taller and thicker. When centrifugal force acts on the composite blade, the blade root supports the composite blade against the centrifugal force with surface traction received on surfaces of the blade root and with interlaminar shear loads acting between the composite material layers. In this condition, with a larger declining angle of the surface, the surface of the blade root can receive greater surface traction, and, at the same time, component forces due to the interlaminar shear loads can be smaller. Therefore, the interlaminar shear loads acting between the composite material layers are reduced, whereby the risk of incurring damage between the composite material layers can be further reduced.

It is preferable that the second lay-ups include a central lay-up that is disposed at the center in the thickness direction of the blade, and the central lay-up is formed extending outward from one end in the thickness direction of the blade and inward to an opposite end in the thickness direction of the blade.

With this configuration, parts of the first lay-up that extend on the periphery of the central lay-up have, in one side that corresponds to the opposite end, shapes that near toward the center side in the thickness direction of the blade. The central lay-up 41 can be thus held by the parts of the first lay-up 30 that are on the periphery thereof, and the central lay-up can be prevented from coming off from the blade root even when damage occurs to the boundary between the central lay-up and the first lay-up.

It is preferable that the second lay-ups include a plurality of outer lay-ups disposed closer to the outer side than the central lay-up is in the thickness direction of the blade, each of the plurality of outer lay-ups is curved from the one end to the opposite end to be convex outward in the thickness direction of the blade, and among the plurality of outer lay-ups, an outer lay-up that is disposed closer to the center side in the thickness direction of the blade has a smaller curvature radius at the opposite end than an outer lay-up that is disposed closer to the outer side in the thickness direction of the blade.

With this configuration, parts of the first lay-up that extend on the periphery of each of the outer lay-ups are also curved with contours convex outward in the thickness direction of the blade, and a part of the first lay-up that is disposed closer to the center side has a smaller curvature radius (is more sharply curved). As a result, the parts of the first lay-up that are disposed on the periphery of the central lay-up are most sharply curved, whereby the ratio of the maximum thickness of the central lay-up to the minimum thickness thereof along the opposite end thereof can be made relatively large. Therefore, the central lay-up is more favorably held by the parts of the first lay-up that are on the periphery thereof, whereby the central lay-up can be more favorably prevented from coming off from the blade root.

It is preferable that a foam layer formed of foaming resin and disposed at the center side of the airfoil in the thickness direction of the blade is further included, the foam layer is formed such that an end part has a wedge shape extending toward the base end side along a course of the end part from the outer side to the center side in the thickness direction of the blade, and the first lay-up includes central layers that extend from the end part of the foam layer toward the base end side in the blade root.

With this configuration, parts of the first lay-up that extend on the periphery of the end part that has a wedge shape can be pressed outward in the thickness direction of the blade in a wide range in the process of heating and curing foaming resin when the foam layer is formed. As a result, the generation of voids in the first lay-up is prevented in the neighborhood of a root part of the airfoil, the root part joining to the blade root. Therefore, the strength of the root part of the airfoil, which joins to the blade root, can be enhanced.

It is preferable that the end part of the foam layer is provided in a range in which interlaminar tensile stress acts on the composite material layers.

With this configuration, the foam layer can be prevented from being crashed with a compressive load acting on the foam layer.

It is preferable that the central layers include a cover layer as part of the composite material layers that is disposed closest to the center side in the thickness direction of the blade, the cover layer extending on the periphery of the foam layer and extending into the airfoil.

With this configuration, the closed ends of the composite material layers that extend on outer sides of the cover layers of the central layers can be kept out of contact with the end part of the foam layer. As a result, when the foam layer is formed, this configuration makes it possible to prevent a defect such that adjacent ones of the closed ends of the composite material layers that are provided as the central layers are separated from each other because of the foaming resin. As described above, when the foam layer is formed, this configuration also makes it possible to stabilize the shapes of boundary surfaces of and between the foam layer and the central layers because the respective closed ends of the composite material layers other than the cover layers among the central layers are pressed through the cover layers.

A method according to another aspect of the present invention is of manufacturing a composite blade formed by laying up composite material layers in which reinforcement fibers are impregnated with resin in a thickness direction of the blade. The composite blade includes a blade root provided on a base end side and an airfoil provided on a tip side. The method includes forming a first lay-up configured as a lay-up in which some of the composite material layers are laid up, the first lay-up being provided in the blade root so as to space parts of the composite material layers apart from each other starting from the base end side to form a plurality of spacing parts and so as to extend from the tip side toward the base end side in the thickness direction of the blade; and forming a plurality of second lay-ups each configured as a lay-up in which some of the composite material layers are laid up, the second lay-ups being provided in the spacing parts in the first lay-up in the blade root so as to be lined up in the thickness direction of the blade. Among the plurality of second lay-ups, a second lay-up closer to a center side than to an outer side in the thickness direction of the blade is a larger distance from a proximal position to a top position. Forming the first lay-up includes laying up the composite material layers for forming a part of the first lay-up in each step in a stepwise process to form the first lay-up. Forming the second lay-up includes laying up, each time forming the first lay-up is performed, the composite material layers for forming the corresponding second lay-up on the composite material layers that have been laid up at forming the first lay-up performed immediately before.

With this configuration, the respective second lay-ups are disposed in the spacing parts between corresponding adjacent ones of the first lay-ups, which makes it possible to enhance the strength of the blade root by reducing regions containing no reinforcement fiber as far as possible even with the blade root extending outward in the thickness direction of the blade. In addition, a line connecting the respective ends of the second lay-ups is formed so as to extend toward the tip as the line runs from the outer side toward the center side in the thickness direction of the blade. That is, the second lay-up that is disposed closer to the outer side in the thickness direction of the blade is shorter. Thus, the individual second lay-ups can be disposed apart from regions in which particularly high interlaminar shear stress tends to occur, that is, the neighborhoods of the curving parts on the surfaces of the blade root. Consequently, stress occurring in ply drops in the second lay-ups can be alleviated, which makes it less likely to have damage that originates from the ply drops. Therefore, the present invention can provide a method of manufacturing a composite blade that prevents the strength of the blade root from deteriorating.

While certain embodiments have been described, these embodiments are not intended to limit the scope of the inventions. The components in the embodiments include ones that a person skilled in the art can easily conceive of, ones that are substantially the same, or ones that fall within their equivalents. Furthermore, various omissions, substitutions, combinations, and changes may be made as appropriate to configurations of the components disclosed in the embodiments without departing from the spirit of the inventions.

The invention claimed is:

1. A composite blade formed by laying up composite material layers in which reinforcement fibers are impregnated with resin in a thickness direction of the blade, the composite blade comprising:
   a blade root provided on a base end side;
   an airfoil provided on a tip side;
   a first lay-up configured as a lay-up in which some of the composite material layers are laid up, the first lay-up being provided in the blade root so as to space parts of the composite material layers apart from each other starting from the base end side to form a plurality of spacing parts and so as to extend from the tip side toward the base end side in the thickness direction of the blade; and
   a plurality of second lay-ups each configured as a lay-up in which some of the composite material layers are laid up, the second lay-ups being provided in the spacing parts in the first lay-up in the blade root so as to be lined up in the thickness direction of the blade, wherein
   each of the second lay-ups has a first end and an opposite second end in a longitudinal direction of the composite blade, the second end of each second lay-up being arranged at the base end side,
   among the plurality of second lay-ups, a second lay-up closer to a center side than to an outer side in the thickness direction of the blade is a larger distance from a proximal position to a top position,
   the plurality of second lay-ups include a central lay-up that is disposed at the center in the thickness direction of the blade, and a plurality of outer lay-ups disposed closer to the outer side than the central lay-up is to the outer side in the thickness direction of the blade,
   the central lay-up is formed so as to extend, from the first end of the central lay-up, outward in the thickness direction of the blade and then inward in the thickness direction of the blade, to the second end of the central lay-up,
   an inner surface of each of the plurality of outer lay-ups are each curved to be concave to the center side in the thickness direction of the blade, and
   among the plurality of outer lay-ups, the inner surface of an outer lay-up that is disposed closer to the center side in the thickness direction of the blade has a smaller curvature radius at the second end than that of the inner surface of an outer lay-up that is disposed closer to the outer side in the thickness direction of the blade.

2. The composite blade according to claim 1, wherein a difference between the first ends of adjacent second lay-ups in the longitudinal direction of the composite blade is larger as the adjacent second lay-ups are closer to the center side than to the outer side in the thickness direction of the blade.

3. The composite blade according to claim 1, wherein out of the plurality of second lay-ups, a second lay-up that is disposed closer to the center side in the thickness direction of the blade has a larger thickness in the thickness direction of the blade than a second lay-up that is disposed closer to the outer side in the thickness direction of the blade.

4. A composite blade formed by laying up composite material layers in which reinforcement fibers are impregnated with resin in a thickness direction of the blade, the composite blade comprising:
   a blade root provided on a base end side;
   an airfoil provided on a tip side;

a first lay-up configured as a lay-up in which some of the composite material layers are laid up, the first lay-up being provided in the blade root so as to space parts of the composite material layers apart from each other starting from the base end side to form a plurality of spacing parts and so as to extend from the tip side toward the base end side in the thickness direction of the blade;

a plurality of second lay-ups each configured as a lay-up in which some of the composite material layers are laid up, the second lay-ups being provided in the spacing parts in the first lay-up in the blade root so as to be lined up in the thickness direction of the blade; and a foam layer formed of foaming resin and disposed at the center side of the airfoil in the thickness direction of the blade, wherein among the plurality of second lay-ups, a second lay-up closer to a center side than to an outer side in the thickness direction of the blade is a larger distance from a proximal position to a top position, a foam layer formed of foaming resin and disposed at the center side of the airfoil in the thickness direction of the blade, wherein the foam layer is formed such that an end part has a wedge shape extending toward the base end side along a course of the end part from the outer side to the center side in the thickness direction of the blade, and the first lay-up includes central layers that extend from the end part of the foam layer toward the base end side in the blade root.

5. The composite blade according to claim 4, wherein the end part of the foam layer is provided in a range in which interlaminar tensile stress acts on the composite material layers.

6. The composite blade according to claim 4, wherein the central layers include a cover layer as part of the composite material layers that is disposed closest to the center side in the thickness direction of the blade, the cover layer extending on the periphery of the foam layer and extending into the airfoil.

7. A method of manufacturing a composite blade formed by laying up composite material layers in which reinforcement fibers are impregnated with resin in a thickness direction of the blade, the composite blade including a blade root provided on a base end side and an airfoil provided on a tip side, the method comprising:

forming a first lay-up configured as a lay-up in which some of the composite material layers are laid up, the first lay-up being provided in the blade root so as to space parts of the composite material layers apart from each other starting from the base end side to form a plurality of spacing parts and so as to extend from the tip side toward the base end side in the thickness direction of the blade; and forming a plurality of second lay-ups each configured as a lay-up in which some of the composite material layers are laid up, the second lay-ups being provided in the spacing parts in the first lay-up in the blade root so as to be lined up in the thickness direction of the blade, wherein each of the second lay-ups has a first end and an opposite second end in a longitudinal direction of the composite blade, the second end of each second lay-up being arranged at the base end side, among the plurality of second lay-ups, a second lay-up closer to a center side than to an outer side in the thickness direction of the blade is a larger distance from a proximal position to a top position, the plurality of second lay-ups include a central lay-up that is disposed at the center in the thickness direction of the blade, and a plurality of outer lay-ups disposed closer to the outer side than the central lay-up is to the outer side in the thickness direction of the blade, forming the first lay-up includes laying up the composite material layers for forming a part of the first lay-up in each step in a stepwise process to form the first lay-up, and forming the second lay-up includes laying up, each time forming the first lay-up is performed, the composite material layers for forming the corresponding second lay-up on the composite material layers that have been laid up at forming the first lay-up performed immediately before so that the central lay-up is formed so as to extend, from the first end of the central lay-up, outward in the thickness direction of the blade and then inward in the thickness direction of the blade, to the second end of the central lay-up, inner surface of each of the plurality of outer lay-ups are each curved to be concave to the center side in the thickness direction of the blade, and among the plurality of outer lay-ups, the inner surface of an outer lay-up that is disposed closer to the center side in the thickness direction of the blade has a smaller curvature radius at the second end than that of the inner surface of an outer lay-up that is disposed closer to the outer side in the thickness direction of the blade.

8. A method of manufacturing a composite blade formed by laying up composite material layers in which reinforcement fibers are impregnated with resin in a thickness direction of the blade, the composite blade including a blade root provided on a base end side and an airfoil provided on a tip side, the method comprising:

forming a first lay-up configured as a lay-up in which some of the composite material layers are laid up, the first lay-up being provided in the blade root so as to space parts of the composite material layers apart from each other starting from the base end side to form a plurality of spacing parts and so as to extend from the tip side toward the base end side in the thickness direction of the blade;

forming a plurality of second lay-ups each configured as a lay-up in which some of the composite material layers are laid up, the second lay-ups being provided in the spacing parts in the first lay-up in the blade root so as to be lined up in the thickness direction of the blade;

forming a foam layer of foaming resin so as to be disposed at the center side of the airfoil in the thickness direction of the blade, wherein among the plurality of second lay-ups, a second lay-up closer to a center side than to an outer side in the thickness direction of the blade is a larger distance from a proximal position to a top position, forming the first lay-up includes laying up the composite material layers for forming a part of the first lay-up in each step in a stepwise process to form the first lay-up, forming the second lay-up includes laying up, each time forming the first lay-up is performed, the composite material layers for forming the corresponding second lay-up on the composite material layers that have been laid up at forming the first lay-up performed immediately before, and forming the foam layer includes forming the foam layer such that an end part has a wedge shape extending toward the base end side along a course of the end part from the outer side to the center side in the thickness direction of the blade, and the first lay-up includes central layers that extend from the end part of the foam layer toward the base end side in the blade root.

* * * * *